United States Patent

[11] 3,539,047

[72] Inventor Martin J. Hermanns
Fort Wayne, Indiana
[21] Appl No. 753,971
[22] Filed Aug. 20, 1968
[45] Patented Nov. 10, 1970
[73] Assignee Dana Corporation
Toledo, Ohio
a corporation of Virginia

[54] HOLD DOWN AND RETURN CLIP AND ADJUSTING SCREW ASSEMBLY FOR PIVOTED LEVER CLUTCHES
4 Claims, 4 Drawing Figs.

[52] U.S. Cl. .......................... 192/99,
192/70.3; 267/53
[51] Int. Cl. ............................................. F16d 13/54
[50] Field of Search. ........................... 192/99(A),
70.3

[56] References Cited
UNITED STATES PATENTS
2,724,475  11/1955  Thelander ................. 192/99(A)L X
3,276,555  10/1966  Phelps et al. .............. 192/99(AX)L X

*Primary Examiner*—Benjamin W. Wyche III
*Attorney*—Walter E. Pavlick, Harold D. Shall, Richardson B. Farley and John F. Teigland

ABSTRACT: A spring loaded clutch having release levers is provided with a novel spring clip and adjusting screw assembly so as to yield an easily manufactured assembly which is securely held together yet capable of easy disassembly. The adjusting screw is mounted on the pressure plate and includes a shouldered portion so that the spring clip attached to it is securely mounted with it. The spring clip, itself, has a bent-tab portion which engages the clutch lever end and has connected and integral therewith an L-shaped portion, one leg of the L having an open slot leading to a slightly enlarged bore. The spring clip may thereby be assembled easily on the adjusting screw by sliding the clip over the shank portion of the adjusting screw and then permitting it to move outwardly so that the spring clip bore portion surrounds and holds the shouldered portion of the adjusting screw in a tight and secure manner.

Patented Nov. 10, 1970  3,539,047

INVENTOR.
MARTIN J. HERMANNS
BY
Richard B Franky
ATTORNEY

HOLD DOWN AND RETURN CLIP AND ADJUSTING SCREW ASSEMBLY FOR PIVOTED LEVER CLUTCHES

Friction clutches are widely used to drivingly connect a pair of relatively rotatable elements and usually includes a driving and driven member. In many spring loaded clutches, the driving member includes an annular pressure plate which is axially movable so that one of its surfaces is operative as a friction surface and may be brought into contact with an annular friction surface of the driven member thereby engaging the driven member with the driving member. Resilient means are utilized to cause the engagement of and to maintain driving contact between the friction surfaces. Quite often the disengaging means provided to overcome the resilient means for disengagement of the friction surfaces takes the form of a series of pivoted levers pivotally mounted relative to the driving member. These release levers, of course, compress the resilient means to thereby permit the pressure plate to come to a disengaged position. In order to insure movement of the annular pressure plate, some form of connecting means must be provided between the lever means and the pressure plate so as to drivingly connect one to the other. This connecting means, in many clutch applications, has taken the form of an adjusting screw mounted on the pressure plate and a spring clip having a hold down and return function connected between the adjusting screw and a lever end.

One example of such an arrangement is found in the patent to Thelander U.S. Pat. No. 2,724,475 issued Nov. 22, 1955. In the clutch arrangement shown in this patent the hold down and return clip takes the form of an elongated strip of flat spring material bent to approximately an L-shape with one slotted leg of the L being utilized for attachment to the headed end of the adjusting screw. This leg also includes lugs bent from its outer end in spaced relationship for abutment and location relative to the side of the head of the adjusting screw. The use of such a spring clip, however, necessitates careful assembly of this hold down and return clip on the adjusting screw since the bent lugs may become misaligned and engage beneath the bolt head instead of surrounding it. Such misassembly operation results in an added cost to the clutch manufacture due to the fact that the hold down and return clip must then be physically adjusted relative to its outermost proper position to place the spring clip in its proper load transferring position. Furthermore, the use of bent lugs or the spring clip does not offer as secure a connection as is desired. It would, therefore, be advantageous to provide a hold down and return clip which could be easily physically assembled with the adjusting screw and would also offer a secure connection therebetween.

Accordingly, it is an object of this invention to provide a hold down and return clip and adjusting screw assembly wherein the hold down and return clip may be securely and positively affixed to the adjusting screw.

It is an additional object of this invention to provide a hold down and return clip and adjusting screw assembly for use with a pivotal lever clutch which may be easily and inexpensively placed in an assembled relation.

It is a further object of this invention to provide a hold down and return clip and adjusting screw assembly wherein the adjusting screw includes a shoulder portion and the hold down and the return clip includes a leg having a slot opening outwardly to the end of the leg and inwardly to a bore of sufficient dimension to encompass the shouldered portion of the adjusting screw.

Other and further objects of this invention will be apparent from the following description and claims and may be understood by the accompanying drawings, which by way of illustration show a preferred embodiment of the invention and what is to be considered to be the best mode of applying the above principles.

In a preferred embodiment of this invention a pressure plate is biased towards a friction disk by compression springs acting through release levers carried by a back plate or housing member and pivotal relative to the back plate or housing member about a pivot pin. The compression springs are seated at one of their ends in depressions in the housing member and extend rearwardly therefrom to be seated at their opposite ends in depressions formed in a series of release levers. Each release lever has its pivot pin disposed intermediate its ends so that the axially outer end of the release lever abuts against an adjusting screw extending axially rearwardly from the pressure plate. A hold down and return clip having a general L-shape with a bent-over tab end is mounted on the adjusting screw so that the tab end engages the release lever end. The opposite end of the hold down and return clip that forms one leg of the L-shape includes a slot which opens outwardly of the end of the leg so that the hold down and return clip may be slipped over the shank of the adjusting screw. A bore is also disposed in this leg of the L-shape, the slot portion terminating in this bore. This bore is of larger dimension than the shank portion of the adjusting screw and of sufficient dimension so as to be slidable over a shoulder portion of the adjusting screw, formed on the adjusting screw directly adjacent to its head.

Figure 1:
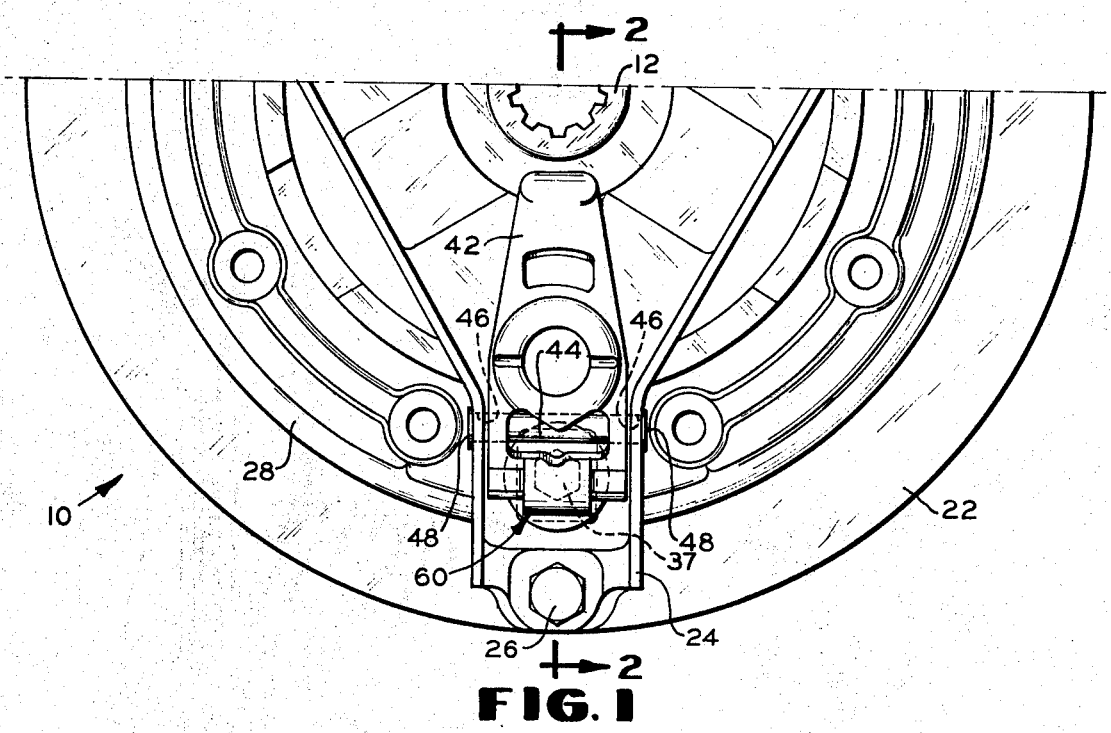
FIG. 1 is a (partial) rear view of a clutch embodying this invention.
Figure 2:
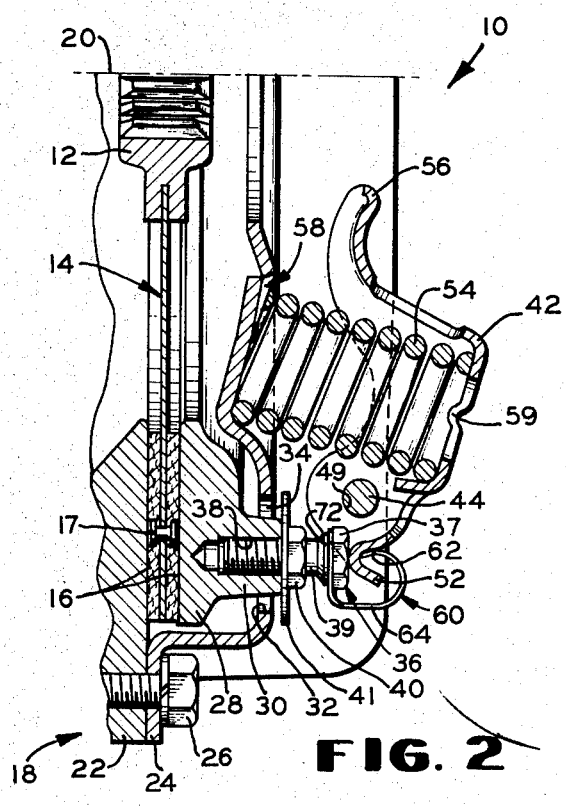
FIG. 2 is a sectional side view taken on lines 2–2 of FIG. 1.
Figure 3:
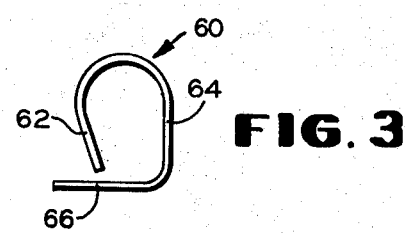
FIG. 3 is a side view of the hold down and return clip of the instant invention.
Figure 4:
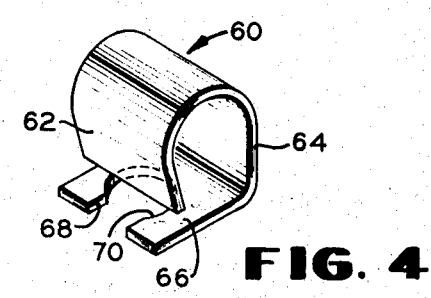
FIG. 4 is a perspective view of the hold down and return clip.

Referring now to FIGS. 1 and 2, the clutch of the instant invention is shown in its engaged position and is indicated generally at 10. It includes an internally splined hub 12 which is adapted to be drivingly connected to a splined shaft which serves as the output of the clutch (not shown) and a driven member or friction disk 14 which extends radially from and is integrally and drivingly connected to the splined hub 12. The driven member 14 has a pair of annular friction faces 16, one being secured by a series of rivets 17 (only one shown) on one axial side of the disk and the other being secured to the other axial side of the disk also by the rivets 17 so that each of the disks are disposed in opposite position to each other, with both being spaced radially outwardly from the hub 12.

A driving member shown generally at 18 is rotatable relative to the driven member 14 about an axis 20. The driving member 18 comprises a flywheel 22 which is driven by a suitable source of rotatable power (not shown), a reaction means formed by a back plate or housing 24 which is securely bolted to the flywheel 22 by a plurality of bolts 26 and a pressure plate 28. Pressure plate 28 is axially movable relative to the flywheel 22 and the back plate 24 and has a plurality of rearwardly extending circumferentially spaced lugs 30 which project through openings 32 provided in the back plate 24. Pressure plate 28, by this arrangement, is conventionally driven by the back plate 24 by means of the lugs 30 drivingly engaging sides 34 of openings 32 formed in the back plate or housing 24.

The lugs 30 are an integral part of the pressure plate 28 and each has an adjusting screw 36 having a head 37 and a shank portion 39 threaded in an axially extending hole 38 provided in the lugs 30 of the pressure plate. A lock nut 40 and a washer 41 are provided on the shank of each screw 36 to lock the screw in position and thereby provide a means for preliminary adjusting of the axial position of the pressure plate 28 in a conventional manner.

Means is provided for axially moving the pressure plate 28 into and out of engagement with the driven member 14 which means is carried by the driving member 18 and comprises a plurality of release levers 42, each having an elongated radial axis which is radially disposed relative to the axis of the pressure plate 28. Each of the release levers is pivoted by a pivot pin 44 so as to be mounted with the driving member 18. This is accomplished by the pivot pins 44 being extended chordally relative to the housing 24 and being secured at their opposite ends in openings 46 in the housing or back plate 24 by means of flanges 48 formed on their ends on the outside of the openings 46. The pivot pins 44 are then received in spaced openings 49 in the release levers 42 so that the latter are pivotally mounted to the back plate or housing 24.

Resilient spring means is provided to pivot the release levers 42 about the pivot pins 44 so that, as viewed in FIG. 2, as each lever 42 is pivoted clockwise, a radially outer end 52 thereof will press against an exposed surface of the head 37 of the screw 36 and urge the pressure plate 28 towards the left and into engagement with the driven member 14. Each of the levers 42 extend radially inwardly from the pivot pin 44 and terminates at a radially inner end 56, which inner end is engaged on the right side thereof by the usual throwout bearing (not shown) which is operative to pivot the same counterclockwise for release of the driven member 14.

Intermediate the ends 56 of each of the levers 42 and the pivot pin 44, a compression spring 54 operatively engages each of the levers 42 and biases the same clockwise about the pivot pin 44 in a direction to bias the pressure plate 28 inwardly against the driven member 14 through the cooperative action of the lever 42. The back plate or housing 24 has a plurality of circumferentially spaced reaction seats shown generally at 58 in which the compression springs 54 seat at their inward ends. Pressure springs 54 extend axially and radially outwardly from the seats 58 and in an angular relationship to the axis of the clutch 10 so as to abut against projections 59 formed on each of the release levers 42 so as to be somewhat free to pivot thereon as the clutch 10 moves between engaged and disengaged position. The clutch structure so far described is generally conventional and is shown, for example, in the patent to Phelps et al., U.S. Pat. No. 3,276,555 issued Oct. 4, 1966.

A spring clip 60 is provided to resiliently connect the head 37 of each adjusting screw 36 with the hook-shaped radially outer end 52 of its cooperating release lever 42. Each spring clip 60 includes a bent-over tab portion providing a first portion 62 which hooks over the outer end of the release lever to provide the aforementioned resilient connection. The spring clip 60 is generally L-shaped in side view and cross section beyond the bent-over tab portion 62 so as to provide a first leg 64 which extends generally axially of the clutch and a second leg 66 which extends generally perpendicular to the axis 20 of the clutch. The second leg 66 includes a slot 68 which opens outwardly of the end of the second leg and extends linearly inwardly therefrom to merge with a bore 70 also formed in the second leg of the L-shape. The slot 68 is of sufficient dimension so as to be easily slidable over the shank portion 39 of the adjusting screw 36, while the bore 70 has a diameter of sufficient size to permit it to slide outwardly and encompass a shoulder portion 72 formed immediately adjacent to the head 37 of the adjusting screw 36. Thus, the spring clip 60 may be easily assembled upon the adjusting screw 36.

Assembly is accomplished in the following manner. The pressure plate 28 and adjusting screws 36 and release levers 42 are mounted with the housing 24 of the clutch. The spring clip 60 has its bent-over tab portion 62 placed in engagement with the radially outer end 52 of release lever 42. The spring clip 60 is then deformed so as to clear the head 37 of the adjusting screw and the slot 68 slid over the shank portion 39 of the adjusting screw. The bore 70 of the spring clip 50 is centered relative to the shoulder portion 72 of the adjusting screw and permitted to resiliently snap up against the inward surface of the head 37 of the adjusting screw. The spring clip, adjusting screw and lever end are then disposed in assembled relationship.

In the foregoing description it is apparent that a hold down and return clip and adjusting screw assembly for a pivoted lever clutch has been provided which makes for easy and sure assembly with its clutch and which forms a secure connection and yet is easily disassembled.

Though only a single embodiment of this invention has been shown and described, it is understood that many changes may be made therein without departing from the scope of the invention.

I claim:

1. In a spring loaded clutch having an axial extent, the combination comprising:
   a. a pressure plate;
   b. a clutch lever having a bent end at its radially outer extent;
   c. lug means on said pressure plate extending axially outwardly therefrom;
   d. adjustable screw means threadably inserted in and extending axially outwardly from said lug means;
   e. said adjustable screw means including,
      1. a headed end;
      2. a shouldered portion disposed immediately forwardly of said headed end; and
      3. a shank portion integrally connected to said shouldered portion and of smaller diameter than said shouldered portion;
   f. a hold down and return clip means disposed between and attached to said adjustable screw means and said bent end of said lever;
   g. said hold down and return clip means being of a resilient material and shaped so as to provide a bent tab portion and an L-shaped portion integrally attached thereto, with first and second leg portions being formed by said L-shape;
   h. said bent tab portion engaging said bent end of said lever for providing a connection therebetween;
   i. said first leg of said L-shape of said hold down and return clip means extending from said bent tab portion in an axial direction;
   j. said second leg of said L-shape of said hold down and return clip means extending radially inwardly from said first leg; and
   k. said second leg of said L-shape having a slot extending to the radial inward termination of said second leg and merging outwardly thereof with a bore portion disposed in said second leg, said slotted portion being of slightly greater dimension than said shank portion of said adjustable screw and of smaller dimension than said shouldered portion and said bore portion being of slightly greater diameter than said shouldered portion of said adjustable screw, whereby said hold down and return clip means is easily assembled in secure relationship with said clutch lever and said adjusting screw.

2. The combination set out in claim 1 wherein said spring loaded clutch includes:
   a. a housing; and
   b. a spring means extending angularly outwardly from said housing for engaging said clutch lever.

3. The combination set out in claim 2 wherein said spring loaded clutch includes a friction disk and a pressure element and said friction disk is engaged between said pressure plate and said pressure element when said clutch is engaged.

4. In a clutch having a driving member, a housing rigidly connected to said driving member, a driven member disposed intermediate said driving member and said housing member and adjacent to said driving member, a pressure plate disposed intermediate said driven member and said housing, said pressure plate having a series of lugs extending through apertures in said housing, adjusting screws having a threaded shank portion and a head portion, said adjusting screws threadably engaging each of said lugs, release levers pivotally connected intermediate their ends to said housing and arranged to have one free end bearing against an adjusting screw, spring means for resiliently biasing said release levers against said adjusting screws, and clip means for maintaining said adjusting screws and release levers in operative engagement, the improvement comprising a shoulder on each of said adjusting screws disposed intermediate said shank portion and said head portion and having a greater diameter than said shank portion, and said clip means comprising a spring clip formed of resilient material and shaped to provide a bent tab portion and an integral L-shaped portion, said L-shaped portion having first and second leg portions, said bent tab portion adapted to interengage said one end of said release lever, said first leg portion extending in axial alignment with said adjusting screw and said second leg portion adapted to underlie the head of said adjusting screw, said second leg portion having a slot extending from its outer free end and terminating in a bore, said slot being of slightly greater dimension than said shank portion and of smaller dimension than said shoulder, and said bore being of slightly greater diameter than said shoulder, whereby said spring clip may be assembled over said shank portion and locked into engagement with said shoulder portion.